(12) United States Patent
Chen

(10) Patent No.: US 7,643,292 B1
(45) Date of Patent: Jan. 5, 2010

(54) ADJUSTABLE AIR DIRECTOR

(75) Inventor: Chun-Yu Chen, Lujhou (TW)

(73) Assignee: Chenbro Micom Co., Ltd., Chung Ho, Taipei Hsien (TW)

( * ) Notice: Subject to any disclaimer, the term of this patent is extended or adjusted under 35 U.S.C. 154(b) by 0 days.

(21) Appl. No.: 12/318,206

(22) Filed: Dec. 23, 2008

(51) Int. Cl.
*H05K 7/20* (2006.01)

(52) U.S. Cl. .................. 361/695; 361/694; 454/184

(58) Field of Classification Search ................
361/679.47–679.51, 694, 695; 454/184
See application file for complete search history.

(56) References Cited

U.S. PATENT DOCUMENTS

| | | | | |
|---|---|---|---|---|
| 5,871,396 | A * | 2/1999 | Shen | 454/184 |
| 6,155,920 | A * | 12/2000 | Pan et al. | 454/184 |
| 6,194,231 | B1 * | 2/2001 | Ho-Cheng et al. | 438/8 |
| 6,464,578 | B1 * | 10/2002 | Chin et al. | 454/184 |
| 6,970,353 | B2 * | 11/2005 | Brovald et al. | 361/679.5 |
| 7,573,712 | B2 * | 8/2009 | Wu et al. | 361/695 |
| 2004/0027804 | A1 * | 2/2004 | Chen | 361/695 |
| 2005/0195568 | A1 * | 9/2005 | Shyr | 361/695 |
| 2005/0219813 | A1 * | 10/2005 | Cravens et al. | 361/690 |
| 2006/0023419 | A1 * | 2/2006 | Kao et al. | 361/690 |
| 2007/0236882 | A1 * | 10/2007 | Chen | 361/695 |
| 2008/0144281 | A1 * | 6/2008 | Chen et al. | 361/695 |

* cited by examiner

*Primary Examiner*—Gregory D Thompson
(74) *Attorney, Agent, or Firm*—Bacon & Thomas, PLLC

(57) ABSTRACT

For mounting in a host on a motherboard over memory modules in insertion slots and cooler modules on CPUs on the motherboard to guide currents of air in carrying waste heat from the cooler modules and the memory modules to the outside of the host, an adjustable air director is disclosed to include a main air duct shell, which has sliding tracks on the top wall thereof, and a supplementary air duct shell, which is attached to one lateral side of the main air duct shell and has sliding coupling devices respectively coupled to the sliding tracks and movable with the supplementary air duct shell relative to the sliding tracks to adjust the transverse width of the adjustable air director subject to the arrangement of the CPUs and the insertion slots on the motherboard.

10 Claims, 6 Drawing Sheets

ADJUSTABLE AIR DIRECTOR

BACKGROUND OF THE INVENTION

1. Field of the Invention

The present invention relates to an air director for use in a host for guiding currents of air over memory modules in insertion slots and cooler modules on CPUs on a motherboard to carry waste heat away from the host and more particularly, to an adjustable air director that allows adjustment of the transverse width to fit the arrangement of the CPUs and the insertion slots on the motherboard.

2. Description of the Related Art

To satisfy consumers' data processing speed requirements for quick running of different software programs in a computer system, chip precision and multiplex operation must be improved. Following rise in operation speed of an electronic device, the problem of quick dissipation of waste heat becomes critical. If waste heat is not quickly carried away during the operation of an electronic device, the operation stability and efficiency of the electronic device will be affected, resulting in shortening of the lifetime or device damage. Therefore, heat dissipation has become an important subject to study.

For quick dissipation of waste heat from a computer, such as desktop computer or server, cooling fans are usually used to provide forced air.

Further, to enhance heat dissipation efficiency, an air director may be used with fans in a computer to guide currents of air through CPU (central processing unit) and chip modules in insertion slots of a motherboard in the computer. When an air director is used in a computer, it is attached to the motherboard and covered over the CPU and the chip modules on the motherboard with the front and rear open ends thereof respectively attached to a first fan that blows air into the air director and a second fan that draws air out of the air director. During operation of the motherboard, the first fan blows air into the air director and the second fan draws air out of the air director, and therefore waste heat is carried away from the CPU and the chip modules to the outside of the computer quickly.

However, different motherboards from different suppliers (such as INTEL, ASUS and others) have different sizes. Further, the arrangement of CPU and insertion slots on a motherboard from one supplier is different from that the arrangement of CPU and insertion slots on a motherboard from another supplier. Conventional air directors commonly have a fixed size. The use of a conventional air director may encounter the following problems:

1. When an air director is mounted on a relatively smaller motherboard that has CPU and insertion slots arranged together in a dense manner, the air director occupies a relatively higher ratio of surface area of the motherboard and may be unable to effectively guide forced currents of air through the CPU and the chip modules in the insertion slots, lowering the heat dissipation efficiency.

2. When using an air director with a relatively bigger motherboard that has CPU and insertion slots arranged at a relatively greater pitch, the air director may be unable to cover the whole area of the CPU and the insertion slots, resulting in installation failure.

Therefore, it is desirable to provide an air director that can be adjusted to fit different motherboards, eliminating the aforesaid problems and saving much the cost.

SUMMARY OF THE INVENTION

The present invention has been accomplished to provide an adjustable air director that eliminates the aforesaid problems. An adjustable air director according to the present invention is comprised of a main air duct shell and a supplementary air duct shell attached to one lateral side of the main air duct shell. The main air duct shell comprises a plurality of sliding tracks arranged on the top side. The supplementary air duct shell comprises a plurality of sliding coupling devices disposed at the top side and respectively coupled to the sliding tracks of the main air duct shell. By means of moving the sliding coupling devices along the sliding tracks, the transverse width of the adjustable air director is relatively adjusted to fit the arrangement of CPUs and insertion slots on a motherboard. Therefore, the adjustable air director is applicable to any of a variety of motherboards from different suppliers.

Further, the main air duct shell further has a wind guide adjustably mounted on the inside and for setting in between CPUs and insertion slots on the motherboard in which the adjustable air director is installed to guide two flows of air through the cooler modules on the CPUs and the memory modules in the insertion slots separately, facilitating quick dissipation of waste heat.

Further, a breakable stretcher is transversely attached to the front end of the adjustable air director between the supplementary air duct shell and the main air duct shell to support the supplementary air duct shell on one lateral side of the main air dust shell against vibration. The breakable stretcher has breaking lines through which the breakable stretcher can be broken easily subject to the desired length.

DETAILED DESCRIPTION OF THE PREFERRED EMBODIMENT

Figure 1:
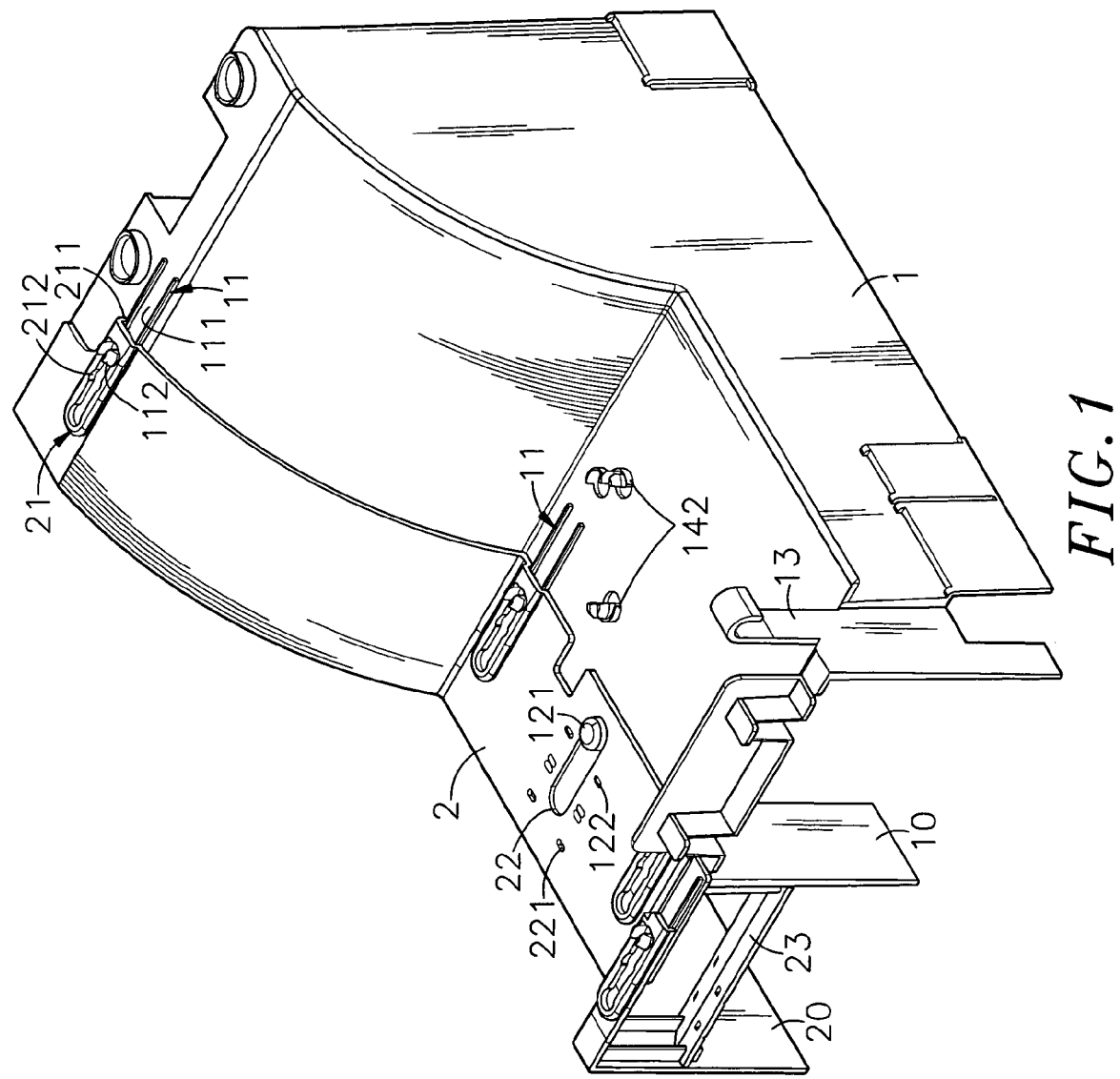
FIG. 1 is an elevational view of an adjustable air director in accordance with the present invention.
Figure 2:
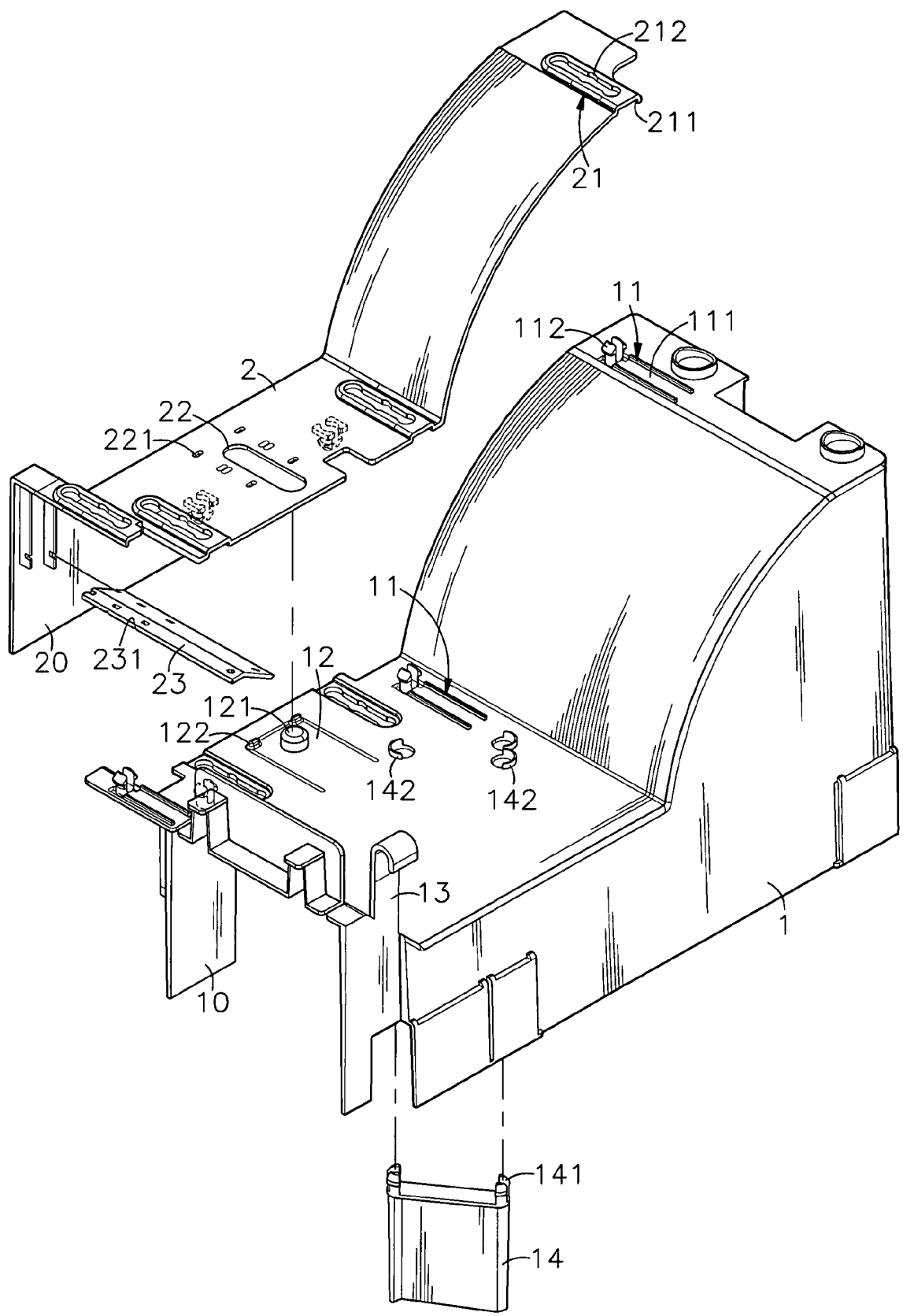
FIG. 2 is an exploded view of the adjustable air director in accordance with the present invention.

Referring to FIGS. 1 and 2, an adjustable air director in accordance with the present invention comprises a main air duct shell 1 and a supplementary air duct shell 2.

The main air duct shell 1 comprises a bottom open side 10 that is attachable to a motherboard in a host around a CPU and adjacent insertion slots, a plurality of sliding tracks 11 provided at the top side, and a springy strip 12 formed of a part of the top wall and extending in a parallel manner relative to the sliding tracks 11. Cutting a substantially U-shaped slot on the top wall of the main air duct shell 1 forms the springy strip 12. The springy strip 12 has one end (the fixed end) formed integral with the top wall of the main air duct shell 1 and the other end (the free end) provided with a press rod 121.

The supplementary air duct shell 2 is provided at one lateral side and transversely movable relative to the main air duct shell 1, comprising a bottom open side 20 for attaching to a motherboard in the host, a plurality of sliding coupling devices 21 provided at the top side and respectively coupled to and movable along the sliding tracks 11 of the main air duct shell 1, and a sliding slot 22 transversely formed in the top side and coupled to the press rod 121 of the springy strip 12 of the main air duct shell 1.

Further, each sliding track 11 of the main air duct shell 1 comprises two transversely extending parallel rails 111, and a split retaining bolt 112 disposed at one end of the parallel rails 111. Each sliding coupling device 21 comprises two parallel coupling grooves 211 respectively slidably coupled to the parallel rails 111 of the associating sliding track 11, and an elongated coupling hole 212 defined between the two parallel coupling grooves 211 and fastened to the split retaining bolt 112.

Further, the springy strip 12 has two raised portions 122 bilaterally disposed near its free end. The supplementary air duct shell 2 comprises a plurality of locating holes 221 formed in the top side and arranged in two lines at two sides relative to the sliding slot 22 for receiving the raised portions 122 of the springy strip 12 selectively.

During the assembly process of the adjustable air director, the supplementary air duct shell 2 is attached to one lateral side of the main air duct shell 1 to have the sliding coupling devices 21 and the sliding slot 22 of the supplementary air duct shell 2 be coupled to the sliding tracks 11 and the press rod 121 of the main air duct shell 1 respectively. When assembled, the parallel rails 111 and split retaining bolts 112 of the sliding tracks 11 of the main air duct shell 1 are respectively coupled to the parallel coupling grooves 211 and the elongated coupling holes 212 of the sliding coupling devices 21 of the supplementary air duct shell 2.

Figure 3:
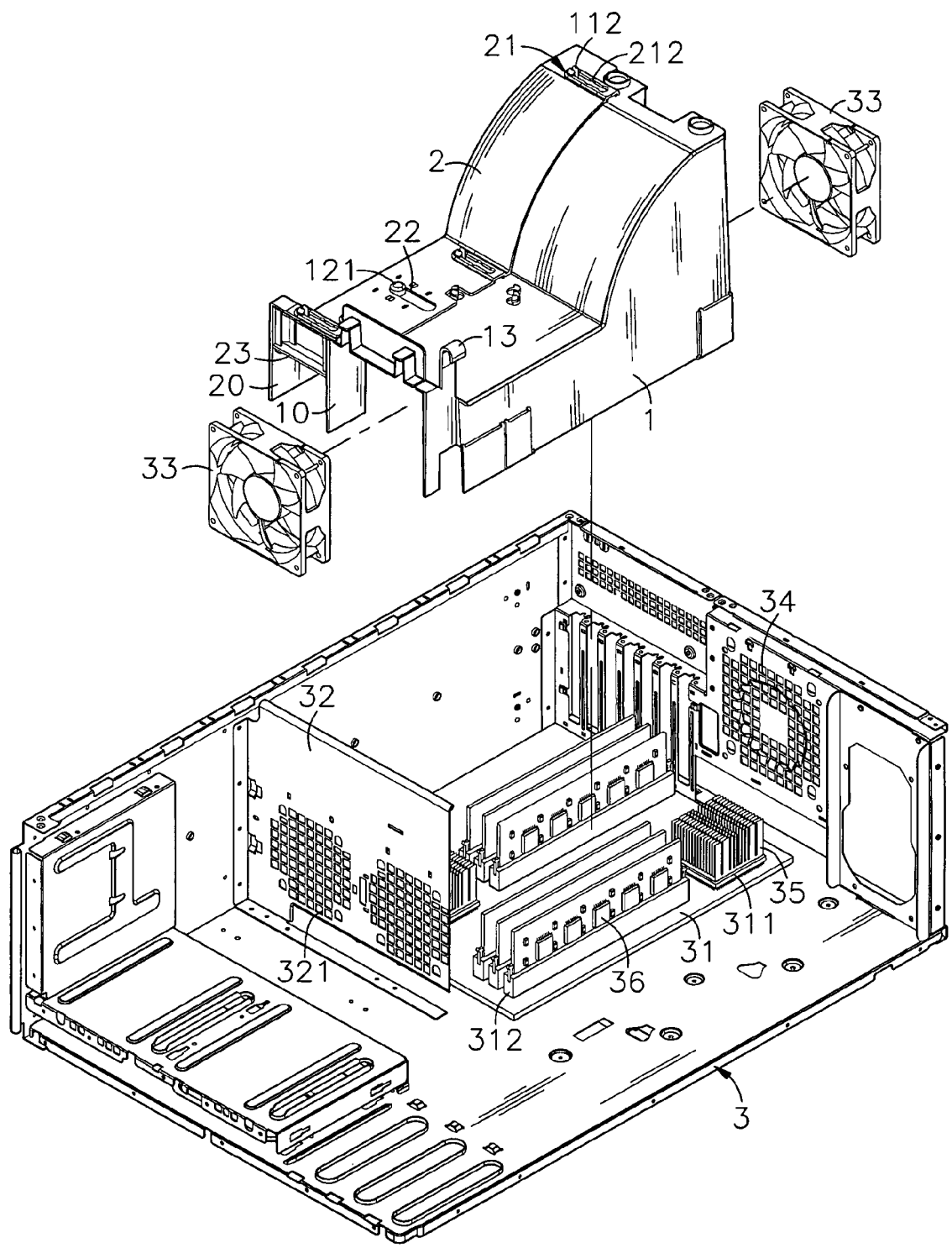
FIG. 3 is a schematic applied view of the present invention before installation of the adjustable air director in a motherboard in a host.
Figure 4:
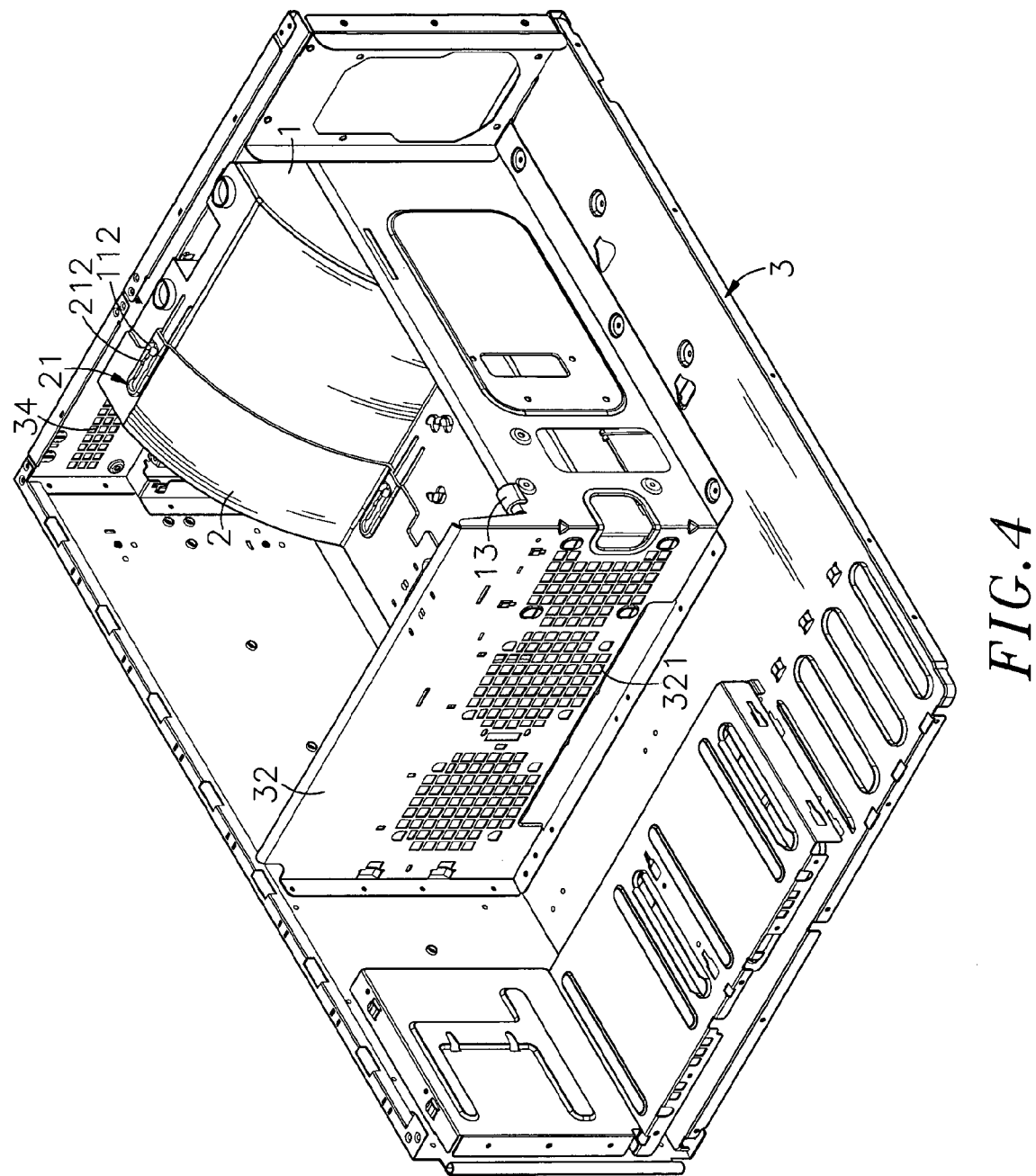
FIG. 4 corresponds to FIG. 3, showing the adjustable air director installed in the host.

Referring to FIGS. 3 and 4, when using the adjustable air director in a host 3, which has installed therein a motherboard 31 (from INTEL, ASUS or any other supplier), which is set between an angled partition wall 32 that has air vents 321 and the back wall of the housing of the host 3 and carries two CPUs 311 and sets of insertion slots 312, cooler modules 35 that are mounted on the CPUs 311, memory modules 36 that include, for example, Dual Inline Memory Module (DIMM) and are inserted in the insertion slots 312, and fans 33 that are mounted on the angled partition wall 32 and an opening 34 on the back panel of the housing of the host 3, the main air duct shell 1 and the supplementary air duct shell 2 are attached to the top side of the motherboard 31 to have the CPUs 311, the cooler modules 35, the insertion slots 312 and the memory modules 36 be received in the bottom open side 10 of the main air duct shell 1 and the bottom open side 20 of the supplementary air dust shell 2. At this time, a mounting hook, referenced by 13, of the main air duct shell 1 is hooked on the angled partition wall 32 of the host 3. After installation, the front and rear sides of the adjustable air director are respectively stopped against the angled partition wall 32 and the back wall of the housing of the host 3 around the fan 33 at the angled partition wall 32 and the fan 33 at the back wall of the housing of the host 3. During operation of the host 3, the fans 33 are started to draw or blow air, enabling the currents of air thus produced to pass through the memory modules 36 and the cooler modules 35 along the air path defined by the adjustable air director, and therefore waste heat is rapidly carried away from the memory modules 36, the CPUs 311 and the cooler modules 35 to the outside of the host 3 by the currents of air.

Figure 5:
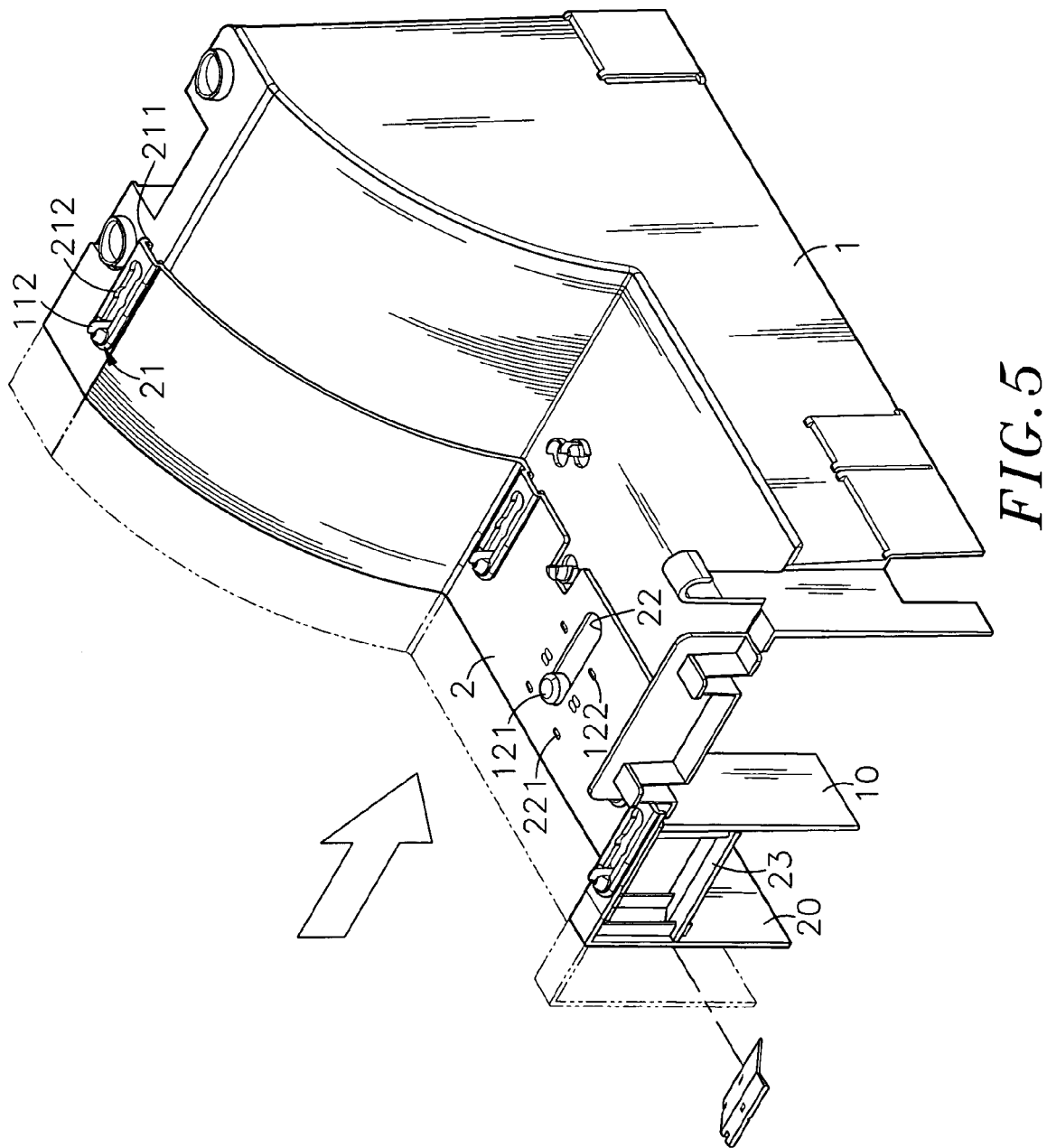
FIG. 5 a schematic drawing of the present invention, showing the supplementary air duct shell adjusted relative to the main air duct shell.
Figure 6:
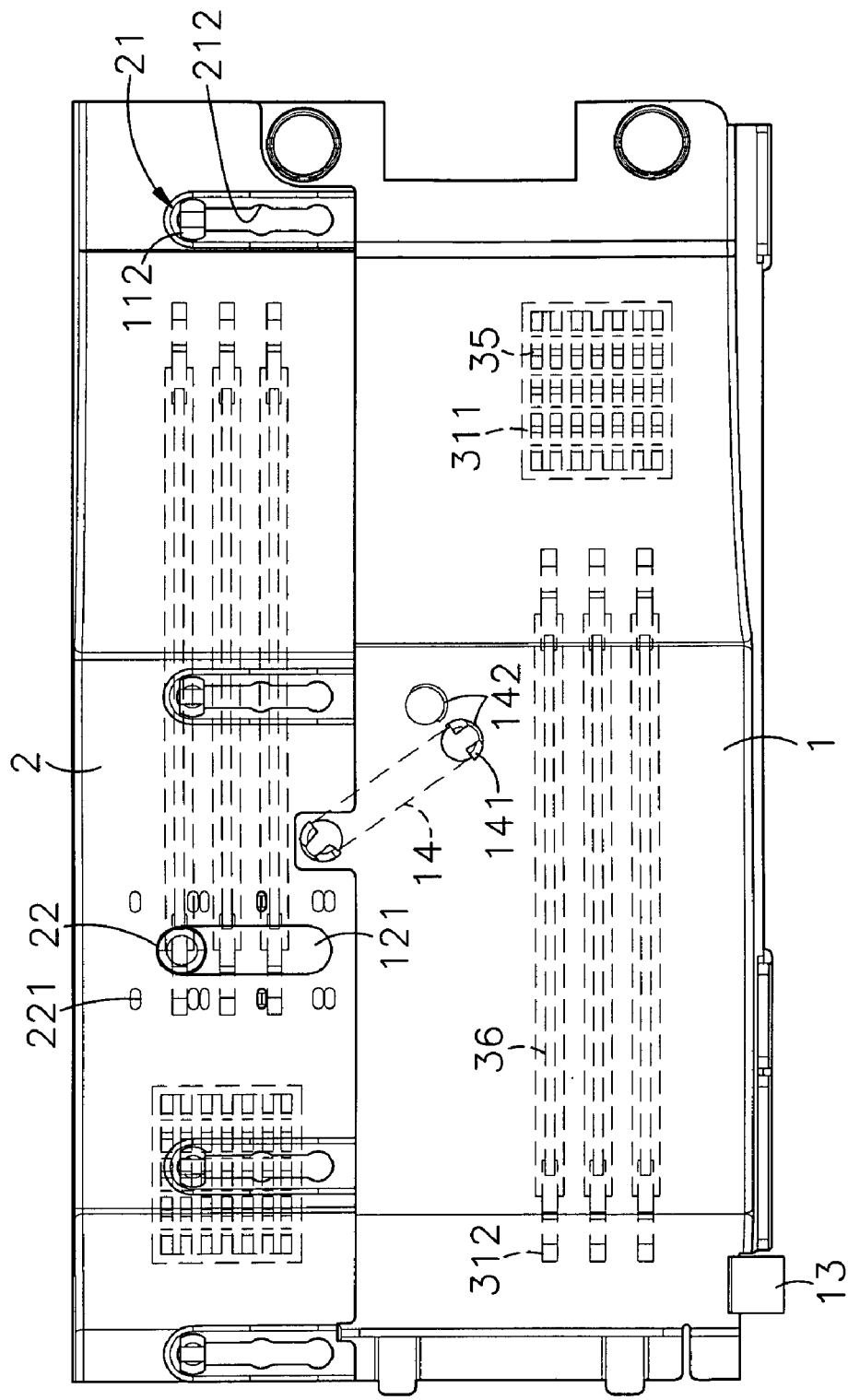
FIG. 6 is a schematic top view of the adjustable air director in accordance with the present invention.

Referring to FIGS. 5 and 6 and FIG. 2 again, a breakable stretcher 23 is provided for attaching to the front end of the adjustable air director between the supplementary air duct shell 2 and the main air duct shell 1, supporting the supplementary air duct shell 2 on one lateral side of the main air dust shell 1 against vibration. The breakable stretcher 23 has breaking lines 231. By means of the breaking lines 231, the breakable stretcher 23 can be broken easily subject to the desired length to fit the adjusted position of the supplementary air duct shell 2 relative to the main air duct shell 1.

Further, because different motherboards 31 from different suppliers (INTEL, ASUS and other suppliers) have different dimensions and carry the CPU 311 and the insertion slots 312 at different locations. To fit a different motherboard, the transverse size of the adjustable air director can be adjusted by means of: pressing the press rod 121 to curve the springy strip 12 downwards and to disengage the raised portions 122 from the respective locating holes 221, and then pulling the supplementary air duct shell 2 transversely away from or pushing the supplementary air duct shell 2 transversely toward the main air duct shell 1 to move the sliding couplings 21 along the respective sliding tracks 11. When moving the supplementary air duct shell 2 relative to the main air duct shell 1, the split retaining bolts 112 are radially inwardly compressed and moved along the respective elongated coupling holes 212. After the supplementary air duct shell 2 has been adjusted to the desired position relative to the main air duct shell 1, the compression force that is applied by the supplementary air duct shell 2 to the split retaining bolts 112 during movement disappears, and therefore the split retaining bolts 112 return to their former shape and secured to the respective elongated coupling holes 212, and at the same time the springy strip 12 returns to its former shape to force the raised portions 122 into engagement with the respective locating holes 221, and therefore the supplementary air duct shell 2 and the main air duct shell 1 are locked in the adjusted position. Thereafter, the breakable stretcher 23 is broken subject to an adjusted gap between the supplementary air duct shell 2 and the main air duct shell 1, and then transversely fastened to the front end of the adjustable air director between the supplementary air duct shell 2 and the main air duct shell 1 to support the supplementary air duct shell 2 on one lateral side of the main air duct shell 1 against vibration.

Further, the main air duct shell 1 has installed therein a wind guide 14 (see FIG. 2). The win guide 14 has two top mounting rods 141 selectively fastened to mounting holes 142 on the top wall of the main air dust shell 1. When the adjustable air director is mounted on the motherboard 31 in the host 3 (see FIGS. 2 and 3), the wind guide 14 is set between the two CPUs 311 and the insertion slots 312. During operation of the host 3 and the fans 33, the wind guide 14 divides the currents of air into two flows that move over the cooler modules 35 and the memory modules 36 separately, thereby carrying waste heat from the cooler modules 35 and the memory modules 36 to the outside of the host 3 efficiently. By means of fastening one top mounting rod 141 of the wind guide 14 to one mounting hole 142 at one location on the top wall of the main air duct shell 1 and the other top mounting rod 141 of the wind guide 14 to one of the other mounting holes 142 at another location on the top wall of the main air duct shell 1, the angle of the wind guide 14 is set subject to the arrangement of the CPUs 311 and the insertion slots 312 on the motherboard 31.

As stated above, the present invention provides an adjustable air director that comprises a main air duct shell 1, which comprises a plurality of sliding tracks 11 at the top side, and a supplementary air duct shell 2, which comprises a plurality of sliding coupling devices 21 respectively coupled to the sliding tracks 11. By means of moving the sliding coupling devices 21 relative to the respective sliding tracks 11, the supplementary air duct shell 2 is transversely adjusted relative to the main air duct shell 1 to let the adjustable air director fit the arrangement of CPUs 311 and insertion slots 312 on a motherboard 31 in a host 3.

In conclusion, the invention provides an adjustable air director, which has the following features and advantages:

1. The sliding coupling devices 21 of the supplementary air duct shell 2 are respectively coupled to the sliding tracks 11 of the main air duct shell 1 and can be moved with the supplementary air duct shell 2 along the sliding tracks 11 to adjust the transverse width of the adjustable air director subject to the arrangement of the CPUs 311 and the insertion slots 312 on the motherboard 31 in the host 3 in which the adjustable air director is to be installed. Therefore, the adjustable air director can fit any of a variety of motherboards in any of a variety of hosts.

2. The main air duct shell 1 has installed therein a wind guide 14 that divides forced currents of air into two flows that move over the cooler modules 35 at the CPUs 311 on the motherboard 31 and the memory modules 36 in the insertion slots 312 on the motherboard 31 separately, thereby carrying waste heat from the cooler modules 35 and the memory modules 36 to the outside of the host 3 efficiently.

3. A breakable stretcher 23 is provided having breaking lines 231. By means of the breaking lines 231, the user can breaks the breakable stretcher 23 subject to the desired length conveniently without any tools and then transversely fasten the breakable stretcher 23 to the front end of the adjustable air director between the supplementary air duct shell 2 and the main air duct shell 1 to support the supplementary air duct shell 2 on one lateral side of the main air dust shell 1 against vibration.

A prototype of adjustable air director has been constructed with the features of FIGS. 1~6. The adjustable air director functions smoothly to provide all of the features disclosed earlier.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. An adjustable air director installed in a host and covered on a motherboard over memory modules in insertion slots and cooler modules on CPUs on said motherboard for guiding currents of air to carry waste heat from said cooler modules and said memory modules to the outside of said host, the adjustable air director comprising:

a main air duct shell, said main air duct shell comprising a bottom open side attached to said motherboard, and at least one sliding track transversely located on a top wall thereof; and a supplementary air duct shell attached to one lateral side of said main air duct shell, said supplementary air duct shell comprising at least one sliding coupling device located on a top wall thereof and respectively coupled to said at least one sliding track and movable with said supplementary air duct shell relative to said at least one sliding track of said main air duct shell for allowing adjustment of the transverse width of the adjustable air director.

2. The adjustable air director as claimed in claim 1, wherein said supplementary air duct shell further comprises an elongated sliding slot cut through the top wall thereof; said main air dust shell further comprises a spring strip extended from the top wall thereof and a press rod coupled to said elongated sliding slot of said supplementary air duct.

3. The adjustable air director as claimed in claim 2, wherein said supplementary air duct shell further comprises a plurality of locating holes arranged in two lines at two sides relative to said elongated sliding slot; said spring strip of said main air dust shell comprises two raised portions selectively engaged into said locating holes of said supplementary air duct shell.

4. The adjustable air director as claimed in claim 1, wherein said at least one sliding track comprises two parallel rails; said at least one sliding coupling device comprises two parallel sliding grooves respectively coupled to said parallel rails of said at least one sliding track.

5. The adjustable air director as claimed in claim 4, wherein said at least one sliding coupling device further comprises an elongated hole defined between said two parallel coupling grooves thereof; said at least one sliding track further comprises a split retaining bolt coupled to said elongated coupling hole of said at least one sliding coupling device.

6. The adjustable air director as claimed in claim 1, wherein said main air duct shell further comprises at least one mounting hook hooked on an inside angled partition wall of said host.

7. The adjustable air director as claimed in claim 1, wherein said bottom open side of said main air duct shell has a front open end attached to an inside angled partition wall of said host around a first fan and a rear open end attached to a back wall of said host around a second fan.

8. The adjustable air director as claimed in claim 1, wherein said main air duct shell further comprises a wind guide mounted on the inside thereof and set between said CPUs and said insertion slots of said motherboard.

9. The adjustable air director as claimed in claim 8, wherein said main air duct shell further comprises a plurality of mounting holes located on the top wall thereof; said wing guide comprises a plurality of top mounting rods selectively fastened to said mounting holes on the top wall of said main air duct shell.

10. The adjustable air director as claimed in claim 1, further comprising a breakable stretcher transversely set in between said supplementary air duct shell and said main air duct shell in a front end of the adjustable air director.

\* \* \* \* \*